United States Patent [19]

Sasaki

[11] Patent Number: 5,012,258

[45] Date of Patent: Apr. 30, 1991

[54] DENSITY CONTROLLED THERMAL PRINT HEAD

[75] Inventor: Eiichi Sasaki, Yokohama, Japan

[73] Assignee: Ricoh Company, Ltd., Tokyo, Japan

[21] Appl. No.: 284,542

[22] Filed: Dec. 15, 1988

[30] Foreign Application Priority Data

Dec. 16, 1987 [JP] Japan .............................. 62-318227
Oct. 7, 1988 [JP] Japan .............................. 63-253201

[51] Int. Cl.$^5$ ........................................ G01D 15/10
[52] U.S. Cl. .............................. 346/1.1; 346/76 PH
[58] Field of Search ......................... 346/1.1, 76 PH

[56] References Cited

U.S. PATENT DOCUMENTS 4,454,516 6/1984 Moriguchi et al. ............ 346/76 PH
4,560,993 12/1985 Hakoyama .................... 346/76 PH

*Primary Examiner*—Bruce A. Reynolds
*Assistant Examiner*—Gerald E. Preston
*Attorney, Agent, or Firm*—Cooper & Dunham

[57] ABSTRACT

A device for driving a thermal print head having a plurality of heat-producing elements arranged in the form of a single array for use in a thermosensitive or thermal transfer recording apparatus is provided. The drive device includes a void data counter for counting void data in the data of an image signal for each of the plurality of heat-producing elements and an adjusting unit for adjusting the level of a preheat energy to be supplied to each of the plurality of heat-producing elements in accordance with the void data count for the corresponding heat-producing element.

8 Claims, 4 Drawing Sheets

DENSITY CONTROLLED THERMAL PRINT HEAD

BACKGROUND OF THE INVENTION

1. Field of the Invention

This invention generally relates to a thermal print head for use in a thermosensitive recording apparatus, a thermal transfer recording apparatus, a copier, a facsimile machine or the like, and, in particular, to a device for driving a thermal print head.

2. Description of the Prior Art

In a thermal print head for use in a thermosensitive recording apparatus, a thermal transfer recording apparatus, or the like, a plurality of heat-producing elements provided in a thermal print head are preheated and selectively activated in accordance with an image signal to be recorded. And, Japanese Patent Laid-open Publication No. 60-67178 teaches a thermal print head drive device to vary the time interval for repeating such a preheat step from a point in time for applying a next drive pulse for recording. However, in such a prior art thermal print head drive device, since each of the plurality of heat-producing elements is preheated irrespective of an image signal, or a dot to be recorded, the preheat energy becomes too high or too low depending on the variation of dots or pixels recorded so that the density of recorded dots or pixels tend to be non-uniform in density.

SUMMARY OF THE INVENTION

In accordance with the present invention, there is provided a device for driving a thermal print head including a plurality of heat-producing elements arranged in the form of a linear array as spaced apart from each other at a predetermined pitch. The, drive device includes a void data counter and a preheat energy adjusting means. The void data counter counts the number of void data in an image signal to be recorded for each of the plurality of heat-producing elements. And, in accordance with a count data of void data for each of the plurality of heat-producing elements by the void data counter, the level of preheat energy to be supplied to each of the plurality of heat-producing elements is suitably adjusted by the preheat energy adjusting means.

It is therefore a primary object of the present invention to obviate the disadvantages of the prior art as described above and to provide an improved device for driving a thermal print head.

Another object of the present invention is to provide an improved thermal print head for use in a thermosensitive recording apparatus using thermosensitive recording paper, a thermal transfer recording apparatus using a plain paper, or the like.

A further object of the present invention is to provide an improved drive device for driving a thermal print head capable of recording an image with uniform density.

A still further object of the present invention is to provide an improved drive device for driving a thermal print head capable of providing a recorded image of high quality at all times.

Other objects, advantages and novel features of the present invention will become apparent from the following detailed description of the invention when considered in conjunction with the accompanying drawings.

DESCRIPTION OF THE PREFERRED EMBODIMENTS

Figure 1:
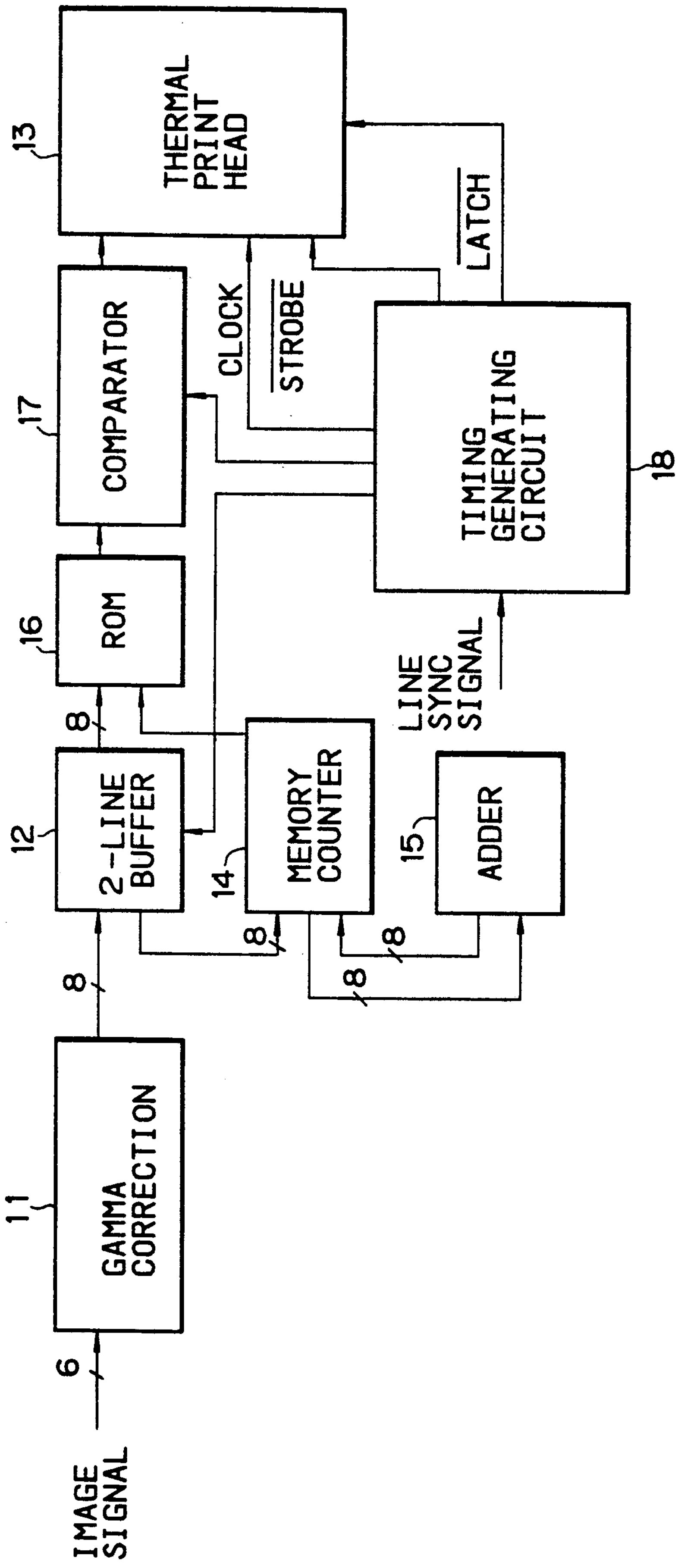
FIG. 1 is a block diagram showing the overall structure of a thermal print head drive device constructed in accordance with one embodiment of the present invention.

Referring to FIG. 1, there is shown a driver device or circuit for driving a thermal print head for use in a thermosensitive recording apparatus, a thermal transfer recording apparatus, or the like. The thermosensitive recording apparatus is of the type in which use is made of a sheet of thermosensitive paper on which an image is directly recorded by forming the so-called "burn" spots thereon. The thermal transfer recording apparatus is of the type in which use is made of a sheet of plain paper as a recording medium and a thermosensitive ink ribbon, in which the ink is selectively transferred from the ribbon to the plain paper to record an image on the plain paper.

In the structure shown in FIG. 1, a 64-tone data is input as an image signal into a gamma correction circuit 11 including a read only memory table, where the so-called gamma correction is carried out so as to obtain an appropriate relation between the recording density and the number of driver pulses to be applied to each of a plurality of heat-producing elements provided in a thermal print head 13. A data output from the gamma correction circuit 11 is written into a 2-line buffer 12 having a capacity to store two lines of data, alternately between the two lines. In the illustrated embodiment, the thermal print head 13 is provided with 2,560 heat-producing elements, such as electrical resistors, arranged in the form of a single array as spaced apart from each other at a predetermined pitch, and, thus, those heat-producing elements define one line of an image to be recorded.

A counter memory 14 is connected to the 2-line buffer 12 and "00" is written into the counter memory 14 if there is a dot to be recorded in one line of data stored into the 2-line buffer 12. That is, "00" is written into the counter memory 14 if a data stored into the 2-line buffer 12 has a dot to be recorded for each of the plurality of heat-producing elements and nothing happens if the data is a void data which does not record a dot. An adder 15 is also provided and it adds "1" to the 2,560 counts of the counter memory 14 for each line period for recording one line, and its result is written into the same position of the counter memory 14 again.

Thus, each count of the counter memory 14 continuously increases if an image signal remains a void data though the number of lines to be recorded gradually increases; on the other hand, it remains to be "1" if an image signal is not a void data even once. When each count of the counter memory 14 has reached "FF", its count is maintained at "FF" thereafter.

One line of data which has been later stored into the 2-line buffer 12 is transferred to a comparator 17 through a ROM 16, which converts the data from the 2-line buffer 12 into data to be applied to the thermal print head 13 by referring to each count of the count memory 14 for each heat-producing element. That is, the ROM 16 converts the data for each heat-producing element output from each position of the 2-line buffer 12 into a drive data to be applied to the thermal print head 13 in accordance with the count of the corresponding position of the counter memory 14. In this instance, if the count of the counter memory 14 is "1", then the data from the 2-line buffer 12 is passed as it is; whereas, if the count of the counter memory 14 is "2" or more, then an appropriate level according to the count is output as a preheat pulse. Accordingly, the number of preheat pulses for preheating each heat-producing element varies depending on the spacing between dots to be recorded by the corresponding heat-producing element. The comparator 17 compares the data from the ROM 16 with a reference data. In order to obtain a multi-tone recording density, the reference data is raised by one step or level each time when a data has been output twice from the ROM 16 (i.e., each time when a data of each tone level has been output), thereby causing later data to be more abundant in "0."

The data from the comparator 17 is input into a shift register (not shown) of the thermal print head 13 by a clock CLOCK supplied from a timing generating circuit 18, and then the data is latched into a latch circuit (not shown) of the thermal print head 13 by a latch signal LATCH supplied from the timing generating circuit 18. Then, the data in the latch circuit is supplied to the respective 2,560 heat-producing elements of the thermal print head 13 at the same time by a strobe signal STROBE to have the 2,560 heat-producing elements activated selectively to thereby define a line of heat pattern to be applied to a recording medium. Such a structure as described above of the thermal print head 13 is well known in the art and thus its detailed description is omitted.

Figure 4:
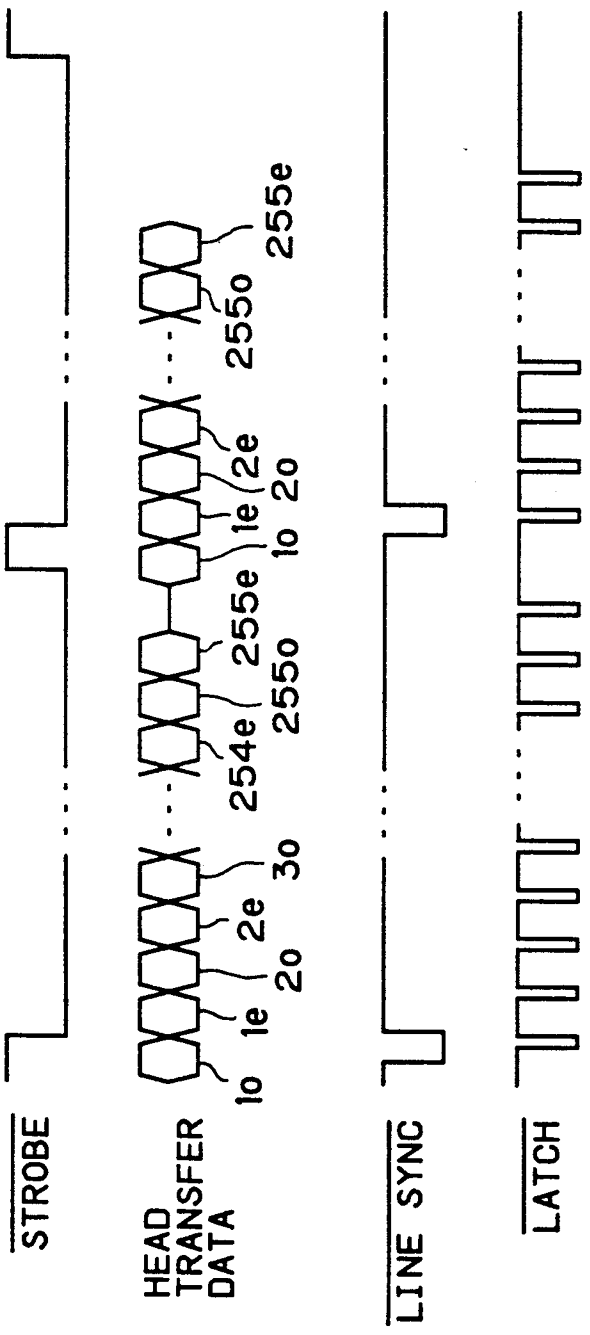
FIG. 4 is a timing chart which is useful for understanding the operation of the structure shown in FIG. 1.

The on/off control of application of heat energy to the thermal print head 13 and also the on/off control of data transfer to the thermal print head 13 are carried out by the timing generating circuit 18 and its timing is diagrammatically shown in FIG. 4. When a LINE SYNC signal has been input into the timing generating circuit 18, the reference data of the comparator 17 is set at the first level of the multi-tone levels while setting even dot data 1*e* to be "0" and only odd dot data 1*o* to be valid, which is then transferred to the shift register of the thermal print head 13 from the 2-line buffer 12 and then latched into the latch circuit in synchronism with the latch signal LATCH. Then, the timing generating circuit 18 causes the strobe signal STROBE to be active, whereby application of energy of the first level of the 64 tone levels is carried out by the odd-numbered heat-producing elements. Upon completion of latching of the above-described dot data, the timing generating circuit 18 sets the odd-numbered dot data 1*o* to be "0" and sets only the even-numbered dot data le to be valid, which is then transferred to the shift register of the thermal print head 13 from the 2-line buffer 12 and then latched into the latch circuit in synchronism with the latch signal LATCH. Thus, application of energy of the first level of the multi-tone levels is carried out by the even-numbered heat-producing elements.

Similarly, the timing generating circuit 18 transfers the odd-numbered data 2*o*, 3*o*, . . . , 255*o* and even-numbered data 2*e*, 3*e*, . . . , 255*e* from the second level to the 255th level of the multi-tone levels in the order of 2*o*, 2*e*, 3*o*, 3*e*, . . . , 255*o*, 255*e* to the thermal print head 13 to thereby carry out application of energy of each of the multi-tone levels by the odd-numbered and even-numbered heat-producing elements, so that application of energy for one line is carried out to carry out recording of one line. In this recording, for example, the ink of an ink ribbon is selectively melted by the heat-producing elements to be transferred to a sheet of recording paper, such as plain paper.

Figure 5:
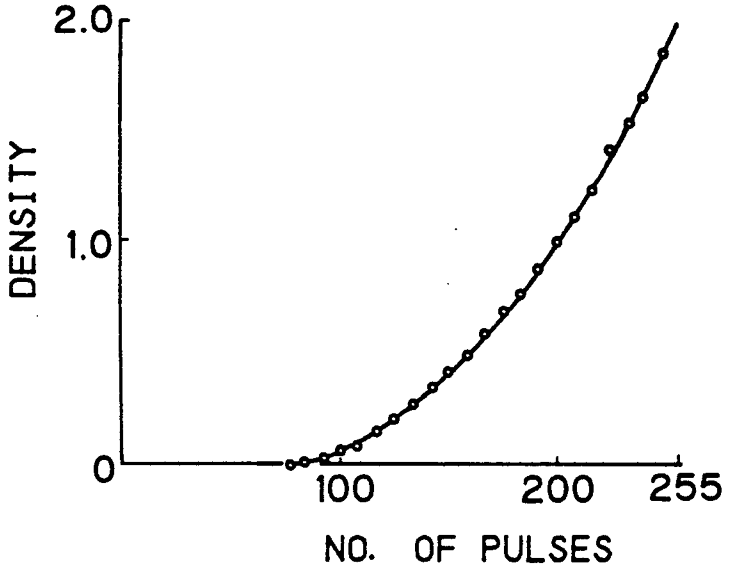
FIG. 5 is a graph showing a relationship between the number of drive pulses applied to a heat-producing element and the recording density in the structure shown in FIG. 1.
Figure 6:
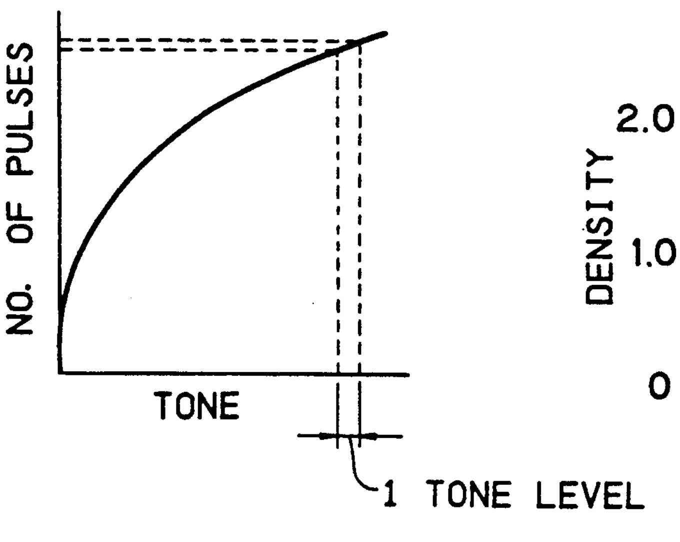
FIG. 6 is a graph showing a relationship between the tone of recording density and the number of drive pulses applied to a heat-producing element in the structure shown in FIG. 1.
Figure 7:
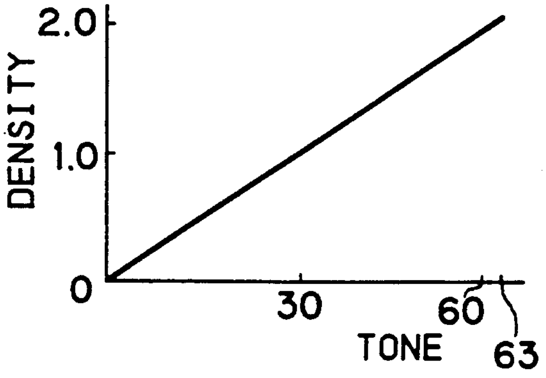
FIG. 7 is a graph showing a relationship between the tone and the recording density in the structure shown in FIG. 1.

The preheat energy to be applied to each of the heat-producing elements, of course, does not melt the ink of an ink ribbon. A relationship between the number of drive pulses to be applied to a heat-producing element and the density of an image recorded by the heat-producing element is illustrated in FIG. 5. As shown, the heat-producing elements only become heated and do not produce enough heat to record a line up to approximately 70 drive pulses, and, thus, the recording density remains "0". If more than 70 drive pulses have been applied, the heat-producing elements start to produce enough heat to carry out recording and the recording density increases non-linearly as the number of drive pulses increases further. From this relationship between the number of driver pulses applied and the recording density shown in FIG. 5, a relationship between the tone level of recording density and the number of drive pulses as shown in FIG. 6 may be derived by using a function approximation method. This relationship shown in FIG. 6 is stored in the form of a table in the gamma correction ROM 11 and thus the relationship between the tone and the recording density is set as a linear relationship as shown in FIG. 7, for example.

Figure 2:
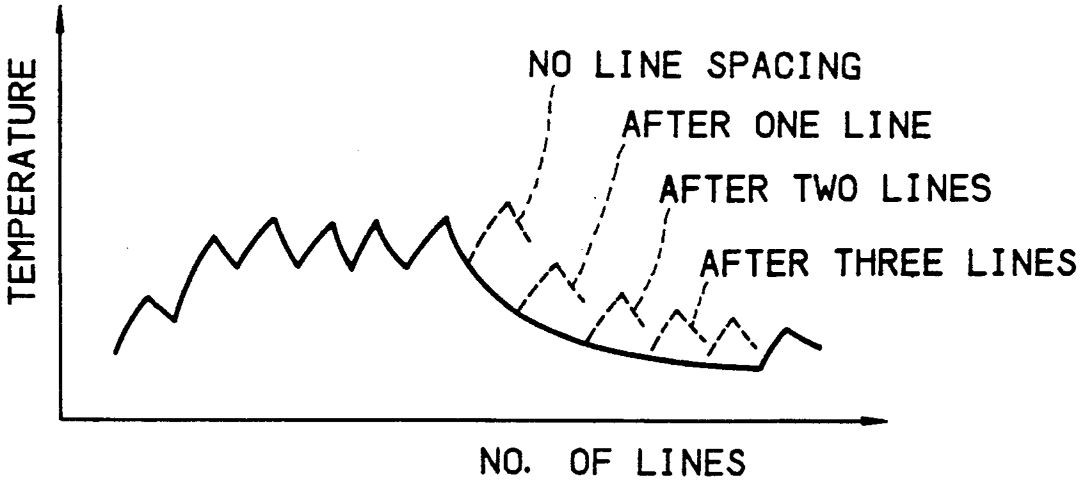
Fig. 2 Prior Art
FIG. 2 is a graph showing the characteristic of a typical prior art thermal print head.
Figure 3:
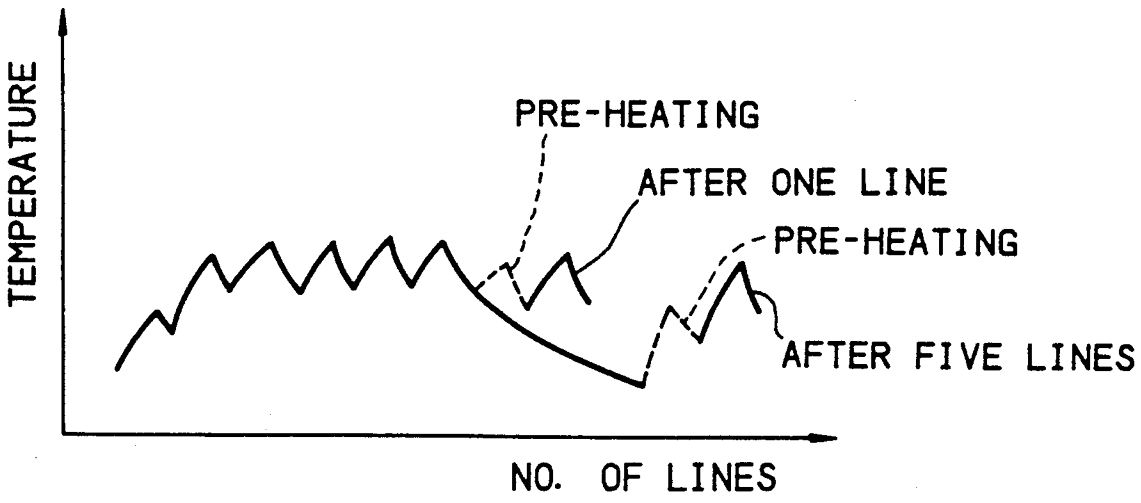
FIG. 3 is a graph showing the characteristic of a thermal print head driven by a drive device of the present invention.

In the prior art thermal print head drive device, the temperature of a heat-producing element varies according to the number of lines recorded as shown in FIG. 2, so that the temperature of a heat-producing element varies depending on the line spacing even if the energy applied to the heat-producing element is maintained at constant. On the other hand, in accordance with the present invention, since the number of preheat pulses for preheating the heat-producing element in accordance with the line spacing is varied, the temperature of the heat-producing element can be maintained at constant as shown in FIG. 3 so that the recording density can be maintained at constant even if the line spacing varies.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A device for driving a thermal print head provided with a plurality of heat-producing elements arranged in the form of a single array, comprising:

counting means for counting the number of void data in an image signal to be supplied to said thermal print head for each of said plurality of heat-producing elements; and adjusting means for adjusting a respective level of a preheat energy to be applied to each of said plurality of heat-producing elements in accordance with the count of void data counted by said counting means for each of said plurality of heat-producing elements.

2. The device of claim 1, including a buffer for temporarily storing data of said image signal, and wherein said adjusting means receives and adjusts the level of said data of image signal according to count information supplied from said counting means.

3. The device of claim 2, in which said buffer in a 2-line buffer capable of storing two lines of said data of image signal.

4. A system comprising a source of image data for recording successive lines of dots on a record medium, a thermal print head having a plurality of heat-producing elements arranged in the form of a single array for forming the respective dots of a line, said image data containing respective image data for each of said heat-producing elements for each of said lines, and a head-driving device receiving said image data and selectively applying driving pulses to the respective heat-producing elements in said thermal head to cause the elements to generate heat corresponding to the number of driving pulses applied thereto, said head-driving device comprising:

a count circuit which is responsive to the image data for the respective heat-producing elements to produce a count for each element which did not record a dot in the line immediately preceding the current line to be recorded, said count being indicative of the number of further immediately preceding lines in which the element did not record a dot; and a control circuit responsive to each respective count and to the image data for said current line to generate for each heat-producing element which did not record a dot in the preceding line, a respective line of preheat energy to be applied to the element prior to applying said driving pulses to the element, in order to maintain the density of said recorded lines at a desired level.

5. A system as in claim 4 in which said image data includes half tone image and said thermal head records a half tone image on said record medium rather than a black-and-white image.

6. A system as in claim 2 in which said count circuit includes a buffer which concurrently stores image data for two lines of said image.

7. A method of recording successive lines of dots on a record medium using a thermal print head having a plurality of heat-producing elements arranged in the form of a single array for forming the respective dots of a line, comprising supplying image data containing respective image data for each of said heat-producing elements for each of said lines and selectively applying driving pulses to the respective heat-producing elements in said thermal head to cause the elements to generate heat corresponding to the number of driving pulses applied thereto, including keeping a respective count for each of the elements which did not record respective dots in the line immediately preceding the current line to be recorded, of the number of successive other immediately preceding lines in which the element did not record a dot and applying pre-heat energy to the elements at a level which is a function of the respective count for the element.

8. A method as in claim 7 in which said image data includes half tone image data and said thermal head records a half tone image on said record medium rather than a black-and-white image.

* * * * *